(12) United States Patent
Gurabardhi et al.

(10) Patent No.: US 11,339,694 B1
(45) Date of Patent: May 24, 2022

(54) OIL LEVEL INDICATOR TUBE

(71) Applicant: GM Global Technology Operations LLC, Detroit, MI (US)

(72) Inventors: Genci I. Gurabardhi, Sterling Heights, MI (US); Karl R. Gilgenbach, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/150,190

(22) Filed: Jan. 15, 2021

(51) Int. Cl.
*F01M 11/12* (2006.01)
*F01M 11/00* (2006.01)
*G01F 23/04* (2006.01)

(52) U.S. Cl.
CPC .......... *F01M 11/12* (2013.01); *F01M 11/0004* (2013.01); *F01M 2011/0066* (2013.01); *G01F 23/04* (2013.01)

(58) Field of Classification Search
CPC .... G01F 23/04; F01M 11/12; F01M 11/0004; F01M 2011/0066
See application file for complete search history.

(56) References Cited

U.S. PATENT DOCUMENTS

| | | | | |
|---|---|---|---|---|
| 2011/0061254 A1* | 3/2011 | Armistead | ............... | G01F 23/04 33/725 |
| 2013/0305552 A1* | 11/2013 | Krishnamurthy | ....... | G01F 23/04 33/728 |
| 2016/0334260 A1* | 11/2016 | Reaume | ................. | G01F 23/04 |

\* cited by examiner

*Primary Examiner* — Syed O Hasan
(74) *Attorney, Agent, or Firm* — Vivacqua Crane, PLLC

(57) ABSTRACT

An automotive engine structural component includes an oil sump formed within the engine structural component, a bore extending from an exterior surface of the engine structural component to the oil sump, an oil level indicator tube supported within the bore, the oil level indicator tube including an upper bead, a lower bead, an o-ring positioned on the oil level indicator tube between the upper and lower beads, the o-ring forming a radial seal between the oil level indicator tube and an interior surface of the bore, and a spacer clip positioned between the upper bead and the o-ring.

17 Claims, 4 Drawing Sheets

OIL LEVEL INDICATOR TUBE

INTRODUCTION

The present disclosure relates to an oil level indicator tube for an automotive engine.

Oil level indicator tubes are generally made from steel to provide adequate stiffness and strength. Because the oil level indicator tube is located on the engine and extends to lower parts of the engine where the oil sump is located, the oil level indicator tube is exposed to water, salt, dirt, oil, as well as very high and low temperature extremes. These conditions lead to corrosion of the oil level indicator tube.

To combat corrosion of the oil level indicator tube, oil level indicator tubes are coated to protect the steel from exposure to various elements. Traditionally, an oil level tube is equipped with a pair of beads and an o-ring. A lower bead provides a positive stop that engages features within a bore of the engine during installation of the oil level indicator tube. The o-ring is positioned on the oil level indicator tube between the upper and lower beads to provide a radial seal between the oil level tube and the bore of the engine into which the oil level tube is being installed. The upper bead prevents the o-ring from sliding upwards along the oil level indicator tube as the oil level indicator tube is installed and the o-ring is squeezed into the bore.

Corrosion of the oil level tube below the o-ring, and the lower bead is not a large concern, as the o-ring prevents these portions of the oil level indicator tube from exposure to harsh external elements. However, during installation of the oil level indicator tube, the upper bead may be scrapped against the inner surface of the bore, compromising any coatings that have been applied to combat corrosion. Additionally, during operation of the engine, vibration of the oil level indicator tube within the bore can cause additional scraping of the upper bead against the inner surface of the bore.

Typically, the bore includes a tapered or conical shaped portion near an external surface of the engine to allow easy entry of the oil level indicator tube and to facilitate gradual compression of the o-ring into a narrow straight section of the bore. To ensure the o-ring is pushed by the upper bead into the narrow straight section of the bore, the upper bead is located close to the lower bead. After installation, the lower bead, the o-ring and the upper bead are all positioned within the narrow straight section of the bore, as shown in FIG. 6A. This means there is minimal clearance between the upper bead and the inner surface of the narrow straight section of the bore, increasing the likelihood that the upper bead will scrap the inner surface of the bore during installation or due to vibration during operation of the engine.

Furthermore, the upper and lower beads are generally integrally formed within the oil level indicator tube. The manufacturing process used to form the upper and lower bead lead to a gradually curved profile. This gradually curved profile on the upper bead does not provide optimal support when pushing the o-ring into the narrow straight section of the bore, and may allow the o-ring to squeeze between the oil level indicator tube and the inner surface of the bore, as shown in FIG. 6B, leading to increased likelihood that the o-ring may be shaved or cut during installation of the oil level indicator tube.

Thus, while current oil level indicator tubes achieve their intended purpose, there is a need for a new and improved oil level indicator tube that allows the upper bead of the oil level indicator tube to be positioned further away from the lower bead, positioned in a section of the bore which has a large enough diameter to provide clearance to minimize the possibility of scraping any applied coatings off the upper bead during installation of the oil level indicator tube and due to vibration of the oil level indicator tube within the bore during operation of the engine. Additionally, there is a need for a new and improved oil level indicator tube which provides increased support to minimize the likelihood of cutting or shaving the o-ring during installation of the oil level indicator tube.

SUMMARY

According to several aspects of the present disclosure, an automotive engine structural component includes an oil sump formed within the engine structural component, a bore extending from an exterior surface of the engine structural component to the oil sump, an oil level indicator tube supported within the bore, the oil level indicator tube including an upper bead, a lower bead, an o-ring positioned on the oil level indicator tube between the upper and lower beads, the o-ring forming a radial seal between the oil level indicator tube and an interior surface of the bore, and a spacer clip positioned between the upper bead and the o-ring.

According to another aspect, the bore further includes a first section, a second section, a shoulder and a third section, the first section extending inward from the exterior surface of the engine structural component and having a conical shape, wherein a diameter of the first section gradually becomes smaller extending from the exterior surface to the second section, the second section having a second diameter, the shoulder section being positioned between and interconnecting the second section and the third section, and the third section having a third diameter.

According to another aspect, the lower bead of the oil lever indicator tube is positioned within the second section of the bore and immediately adjacent the shoulder section, the upper bead of the oil level indicator tube is positioned within the first section of the bore, and the o-ring is positioned within the second section of the bore.

According to another aspect, the spacer clip includes a generally cylindrical c-shaped body having a first axial distal end, a second axial distal end, and first and second opposing circumferential distal ends that define a circumferential gap, and a relaxed inner diameter that is less than an outer diameter of the oil lever indicator tube, the spacer clip adapted to flex, thereby expanding the circumferential gap to allow the oil level indicator tube to pass through the gap when the spacer clip is placed onto the oil level indicator tube, wherein, once placed onto the oil lever indicator tube, an inner surface of the spacer clip frictionally engages the outer diameter of the oil level indicator tube.

According to another aspect, the spacer clip is positioned between the upper bead and the o-ring such that the first axial distal end of the spacer clip is positioned within the first section of the bore and the second axial distal end of the spacer clip is positioned within the second section of the bore, the second axial distal end of the spacer clip adapted to push against the o-ring and prevent the o-ring from moving toward the upper bead during insertion of the oil lever indicator tube within the bore.

According to another aspect, each of the first and second axial distal ends of the spacer clip have an outer annular chamfer with a first radius, an inner annular chamfer with a second radius, and a flat axial surface extending between the inner and outer annular chamfers.

According to another aspect, the first radius of each of the outer annular chamfers is less than the second radius of each of the inner annular chamfers.

According to another aspect, the spacer clip is positioned on the oil level indicator tube, the circumferential gap is approximately 1.42 millimeters.

According to another aspect, the spacer clip is positioned on the oil level indicator tube, an outer diameter of the spacer clip is less than an outer diameter of the upper and lower beads.

According to another aspect, the spacer clip has an axial length and the o-ring has a diameter, the combined axial length of the spacer clip and the diameter of the o-ring when the oil level indicator tube is not installed within the bore being less than the axial distance between the upper and lower beads to accommodate compression of the o-ring during installation of the oil level indicator tube within the bore and thermal expansion of the o-ring during operation of the engine.

According to several aspects of the present disclosure, an oil level indicator tube assembly adapted to be installed within a bore formed within an engine structural component includes an upper bead, a lower bead adapted to contact a shoulder section of a bore within an engine structural component to provide a positive stop when the oil level indicator tube is installed within the bore, an o-ring positioned on the oil level indicator tube between the upper and lower beads, the o-ring having a diameter and adapted to form a radial seal between the oil level indicator tube and an interior surface of a bore in an engine structural component, and a spacer clip positioned between the upper bead and the o-ring, the spacer clip including a generally cylindrical c-shaped body having an axial length, a first axial distal end and a second axial distal end, each of the first and second axial distal ends of the spacer clip having an outer annular chamfer with a first radius, an inner annular chamfer with a second radius that is less than the first radius, and a flat axial surface extending between the inner and outer annular chamfers, the second axial distal end adapted to push against the o-ring and prevent the o-ring from moving toward the upper bead during insertion of the oil lever indicator tube within a bore of an engine structural component, first and second opposing circumferential distal ends that define a circumferential gap that is approximately 1.42 millimeters, the spacer clip adapted to flex, thereby expanding the circumferential gap to allow the oil level indicator tube to pass through the gap when the spacer clip is placed onto the oil level indicator tube, an inner diameter in frictional engagement with an outer diameter of the oil level indicator tube, and an outer diameter that is less than an outer diameter of the upper and lower beads, wherein, the combined axial length of the spacer clip and the diameter of the o-ring is less than the axial distance between the upper and lower beads to accommodate compression of the o-ring during installation of the oil level indicator tube within a bore and thermal expansion of the o-ring.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
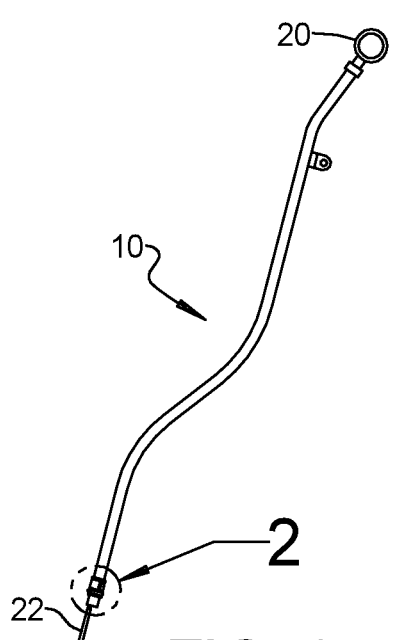
FIG. 1 is a perspective view of an oil level indicator tube assembly according to an exemplary embodiment of the present disclosure.
Figure 3:
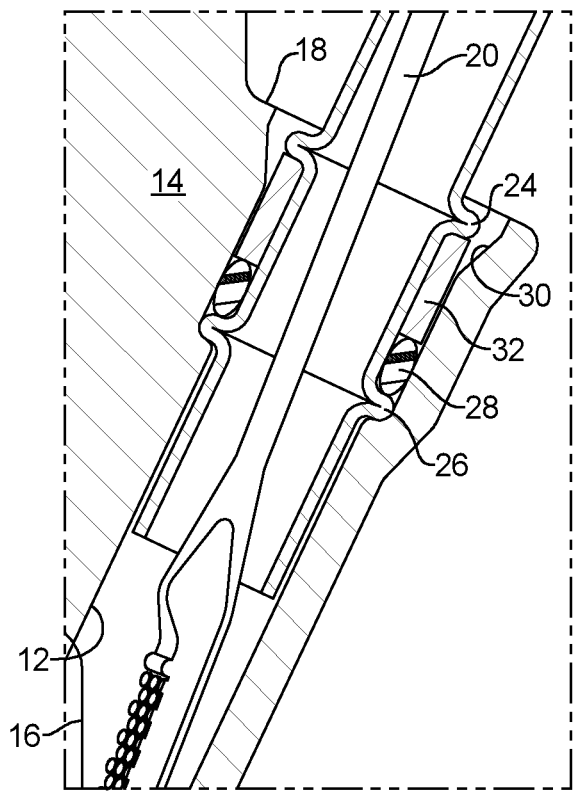
FIG. 3 is a sectional view of an automotive engine structural component including an oil level indicator tube assembly according to an exemplary embodiment.

Referring to FIG. 1, an oil level indicator tube assembly 10 according to the present disclosure is adapted to be inserted within a bore 12 formed within an automotive engine structural component 14. Referring to FIG. 3, in an exemplary embodiment, the automotive engine structural component 14 is part of an engine block. More specifically, as shown, the automotive engine structural component 14 is the lower crankcase extension (LCE) of an internal combustion engine. It should be understood by those skilled in the art that the novel aspects of the present disclosure may be applied to any automotive engine that includes an oil sump for holding a volume of oil or lubricant.

The LCE 14 includes an oil sump 16 for holding a supply of engine oil. The engine oil is pulled from the oil sump 16 by a pump and circulated through oil passages throughout the engine to provide cooling and lubrication to the engine. The LCE 14 includes a bore 12 extending from an exterior surface 18 of the LCE 14 to the oil sump 16. The oil level indicator tube assembly 10 is supported within the bore 12. The oil level indicator tube assembly 10 supports a dip-stick 20 therein. The dip-stick 20 includes an indicator bullet 22 that extends downward into the oil sump 16 when the dip-stick 20 is placed within the oil level indicator tube assembly 10. The dip-stick 20 is removable from the oil level indicator tube assembly 10 to allow a person to remove the dip-stick 20 and inspect the indicator bullet 22 to verify the level of oil within the oil sump 16.

Figure 2:
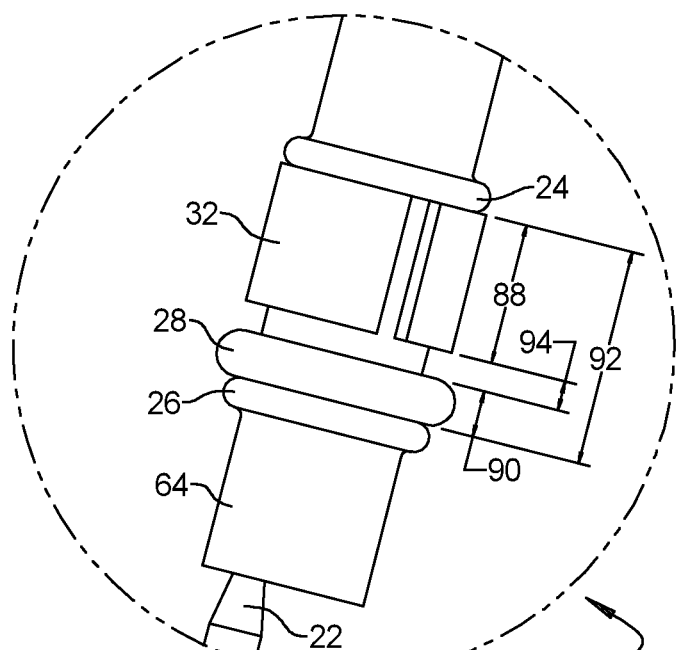
FIG. 2 is an enlarged view of a portion of the oil level indicator tube assembly shown in FIG. 1.

Referring to FIG. 2 and FIG. 3, the oil level indicator tube assembly 10 includes an upper bead 24 and a lower bead 26. The upper and lower beads 24, 26 are integrally formed within the oil level indicator tube assembly 10. In an exemplary embodiment, the oil level indicator tube assembly 10 is compressed during manufacture to cause a portion of the tube to bump out in a defined location to form each of the upper and lower beads 24, 26.

An o-ring 28 is positioned on the oil level indicator tube assembly 10 between the upper and lower beads 24, 26. The o-ring 28 forms a radial seal between the oil level indicator tube assembly 10 and an interior surface 30 of the bore 12. This seal prevents debris from entering the oil sump 16 and prevents oil from splashing upward out of the oil sump 16 through the bore 12. A spacer clip 32 is positioned between the upper bead 24 and the o-ring 28.

Figure 4:
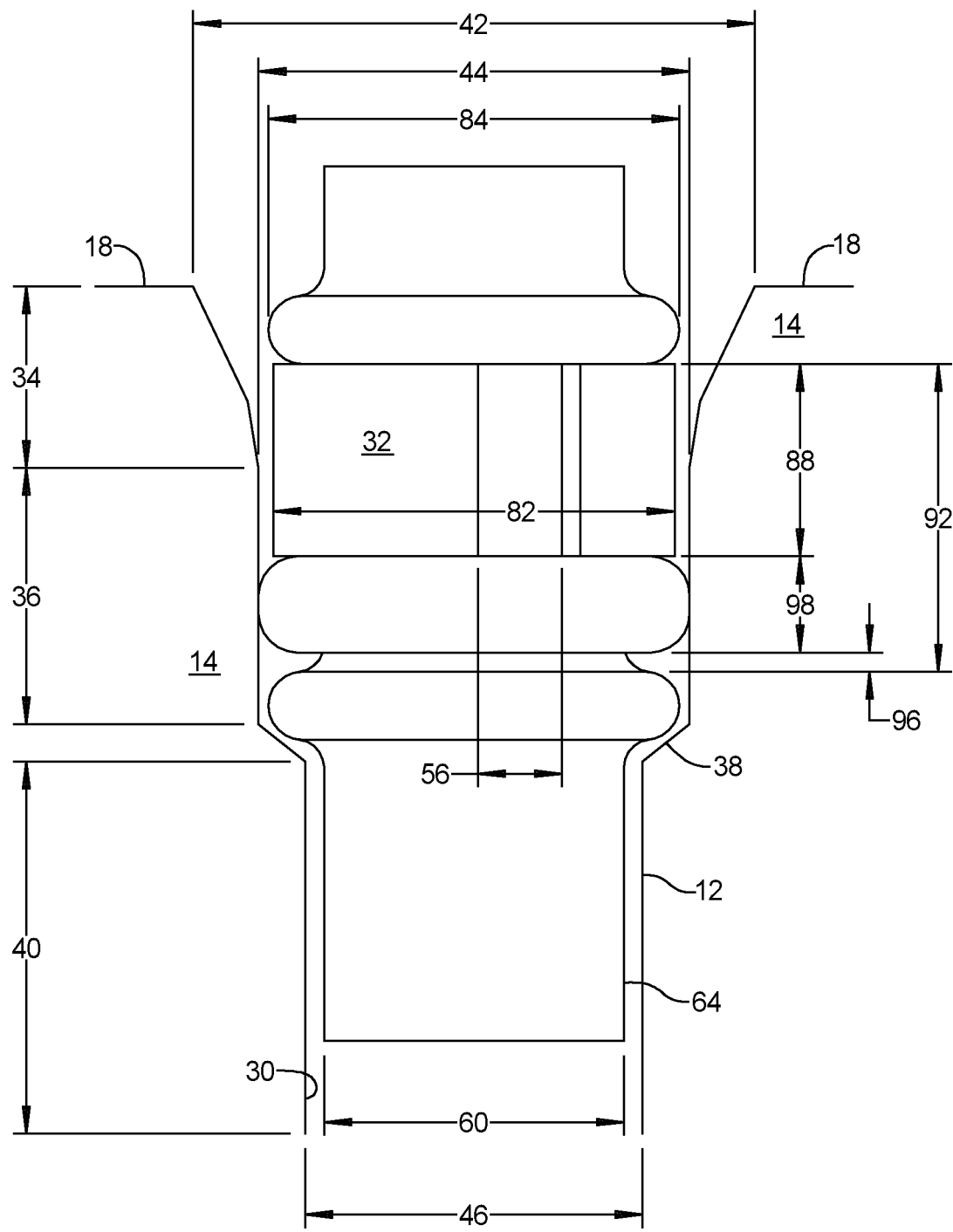
FIG. 4 is a side view of an oil level indicator tube according to an exemplary embodiment of the present disclosure.

Referring to FIG. 4, in the exemplary embodiment shown, the bore 12 in the LCE 14 includes a first section 34, a second section 36, a shoulder 38 and a third section 40. The first section 34 extends inward from the exterior surface 18 of the engine structural component 14 and includes a conical shape. The first section 34 has a first diameter 42 that gradually becomes smaller extending from the exterior surface 18 to the second section 36. The second section 36 is a straight cylindrical section which has a second diameter 44. The third section 40 is also a straight cylindrical section which has a third diameter 46. The third diameter 46 is less than the second diameter 44. The shoulder 38 is positioned between and interconnects the second section 36 and the third section 40. The shoulder 38 provides a neck down from the larger second diameter 44 of the second section 36 to the smaller third diameter 46 of the third section 40.

The lower bead 26 of the oil lever indicator tube assembly 10 is positioned within the second section 36 of the bore 12 and immediately adjacent the shoulder 38. The shoulder 38 provides a positive stop when the oil level indicator tube assembly 10 is installed within the bore 12. The upper bead 24 of the oil level indicator tube assembly 10 is positioned within the first section 34 of the bore 12. The upper bead 24 is positioned near the exterior surface 18 of the LCE 14 where the first diameter 42 of the first section 34 is largest. This provides clearance between the inner surface 30 of the bore 12 within the first section 34 and the upper bead 24 to prevent the upper bead 24 from rubbing against the inner surface 30 of the bore 12 during installation of the oil level indicator tube assembly 10 and from vibration during operation of the engine.

Figure 5A:
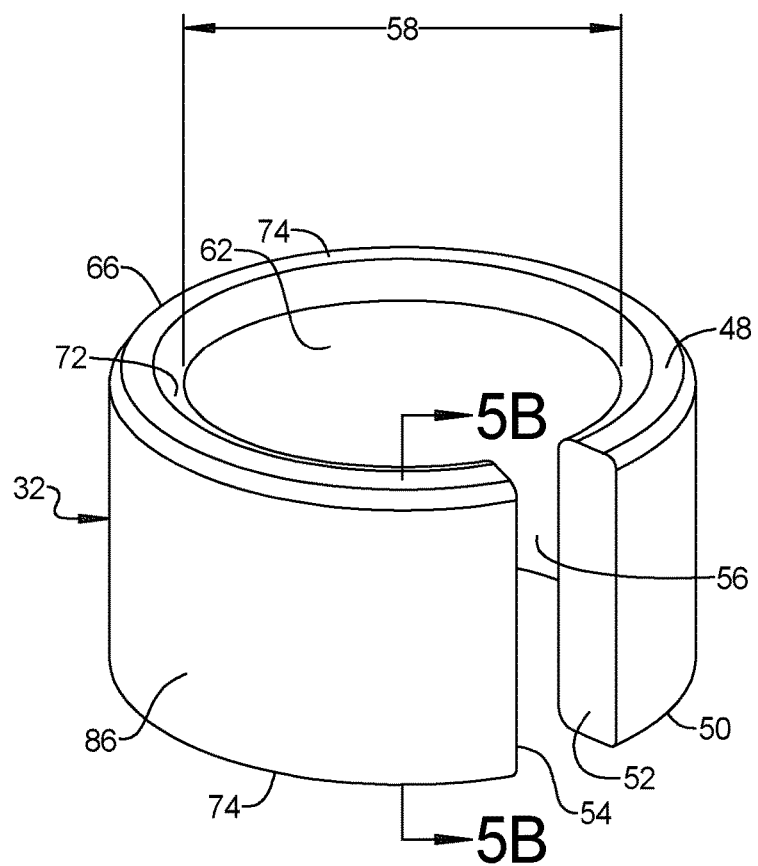
FIG. 5A is a perspective view of a spacer clip according to an exemplary embodiment of the present disclosure.
Figure 5B:
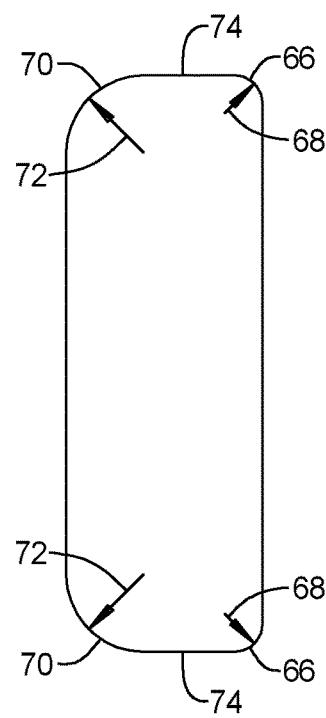
FIG. 5B is a sectional view taken along lines 5B-5B of FIG. 5A.

Referring to FIG. 5A and FIG. 5B, the spacer clip 32 includes a generally cylindrical c-shaped body having a first axial distal end 48, a second axial distal end 50, and first and second opposing circumferential distal ends 52, 54 that define a circumferential gap 56, and a relaxed inner diameter 58 that is less than an outer diameter 60 of the oil lever indicator tube assembly 10. The relaxed inner diameter 58 of the spacer clip 32 is the inner diameter of the spacer clip 32 prior to the spacer clip 32 being placed onto the oil level indicator tube assembly 10. The spacer clip 32 is made from a flexible composite material, such that the spacer clip 32 can flex and the first and second opposing circumferential distal ends 52, 54 can be spread apart. The spacer clip 32 is sufficiently flexible to allow the circumferential gap 56 to expand sufficiently to allow the oil level indicator tube assembly 10 to pass through the circumferential gap 56 when the spacer clip 32 is placed onto the oil level indicator tube assembly 10.

Once placed onto the oil level indicator tube assembly 10, the spacer clip 32 will be biased back toward an un-flexed condition. Because the relaxed inner diameter 58 of the spacer clip 32 is less than the outer diameter 60 of the oil level indicator tube assembly 10, the biasing of the flexible spacer clip 32 will force an inner surface 62 of the spacer clip 32 against an outer surface 64 of the oil level indicator tube assembly 10. Frictional engagement of the inner surface 62 of the spacer clip 32 and the outer surface 64 of the oil level indicator tube assembly 10 keeps the spacer clip 32 positioned on the oil level indicator tube assembly 10 and prevents the spacer clip 32 from vibrating or bouncing relative to the oil level indicator tube assembly 10.

The spacer clip 32 is positioned between the upper bead 24 and the o-ring 28 such that the first axial distal end 48 of the spacer clip 32 is positioned within the first section 34 of the bore 12, adjacent the upper bead 24. The second axial distal end 50 of the spacer clip 32 is positioned within the second section 36 of the bore 12, adjacent the o-ring 28. The second axial distal end 50 of the spacer clip 32 is adapted to push against the o-ring 28 and prevent the o-ring 28 from moving toward the upper bead 24 during insertion of the oil lever indicator tube assembly 10 within the bore 12. The spacer clip 32 located between the upper bead 24 and the o-ring 28 allows the upper bead 24 to be positioned further away from the lower bead 26, in the first section 34. This maintains clearance between the upper bead 24 and the inner surface 30 of the bore 12 as discussed above.

Figure 6A:
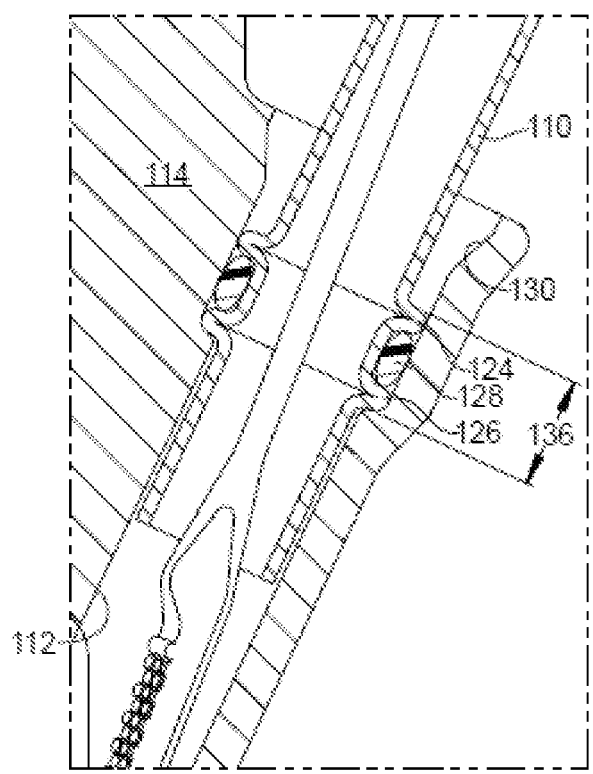
FIG. 6A is a sectional view of an automotive engine structural component including a prior art version of an oil level indicator tube.

Referring to FIG. 6A, in an oil level indicator tube assembly 110 without a spacer clip 32, an upper bead 124 would need to be closer to a lower bead 126 and would end up located in a second section 136 of a bore 112 within an LCE 114, where there would be less clearance between the upper bead 124 and an inner surface 130 of the bore 112, increasing the likelihood that the upper bead 124 would rub against the inner surface 130 of the bore 112 during installation of the oil level indicator tube assembly 110 or due to vibration of the oil level indicator tube assembly 110 during operation of the engine.

Referring to FIG. 5A and FIG. 5B, each of the first and second axial distal ends 48, 50 of the spacer clip 32 have an outer annular chamfer 66 with a first radius 68, an inner annular chamfer 70 with a second radius 72, and a flat axial surface 74 extending between the inner and outer annular chamfers 66, 70. In an exemplary embodiment, the first radius 68 of each of the outer annular chamfers 66 is less than the second radius 72 of each of the inner annular chamfers 70.

Figure 6B:
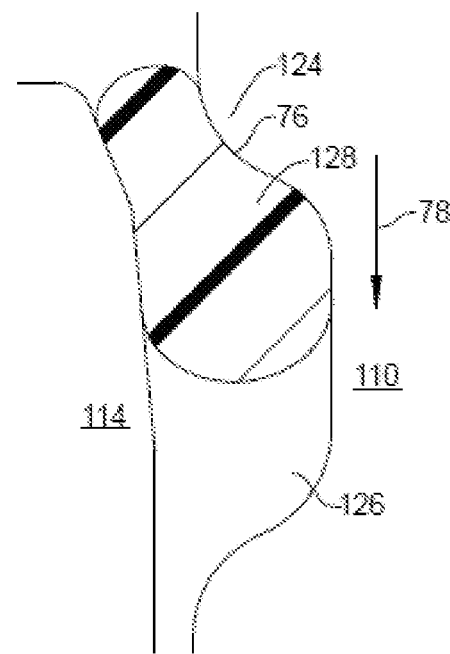
FIG. 6B is a schematic sectional view illustrating the installation of the prior art oil level indicator tube into the automotive structural component shown in FIG. 6A.

Referring to FIG. 6B, the formation of the upper bead 124 leads to a gradually curved profile 76. In applications without a spacer clip 32, as the oil level indicator tube assembly 110 is inserted within the bore 112 of an LCE 114, as indicated by arrow 78, the sloped surface of the upper bead 124 may allow the pliable o-ring 128 to squeeze between the upper bead 124 and the inner surface 130 of the bore 122. This may lead to cutting or shaving of the o-ring 128.

Figure 7:
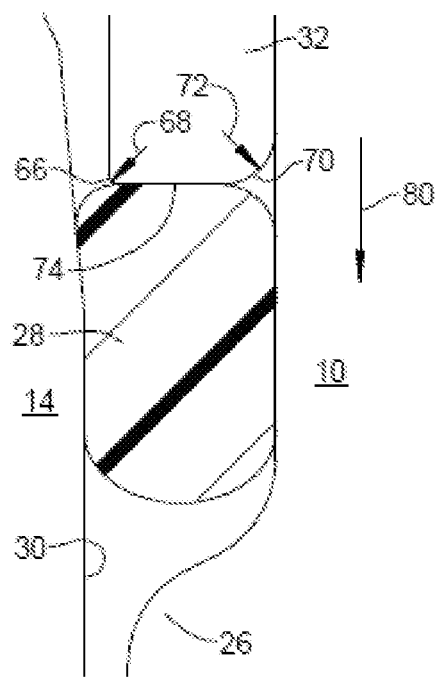
FIG. 7 is a schematic sectional view illustrating the installation of an oil level indicator tube into the automotive structural component according to an exemplary embodiment of the present disclosure.

Referring to FIG. 7, the flat axial surface 74 of the second axial distal end 50 of the spacer clip 32 provides a horizontal surface to push axially on the o-ring 28 during installation of the oil level indicator tube assembly 10. The small first radius 68 of the outer annular chamfer 66 of the spacer clip 32 does not provide as much clearance as the gradually curved profile 76 of the upper bead 28, and the flat axial surface 74 provides increased horizontal support, thereby reducing the likelihood that the o-ring 28 will squeeze between the spacer clip 32 and the inner surface 30 of the bore 12 an reducing the likelihood of cutting or shaving the o-ring 28 during installation of the oil level indicator tube assembly 10, as indicated by arrow 80. In an exemplary embodiment, the first and second axial distal ends 48, 50 of the spacer clip 32 are identical, wherein, the orientation of the spacer clip 32 on the oil level indicator tube assembly 10 does not affect performance of the spacer clip 32.

In an exemplary embodiment, when the spacer clip 32 is positioned on the oil level indicator tube assembly 10, the circumferential gap 56 is approximately 1.42 millimeters. It should be understood that the term "approximately" means+/−0.1 millimeters. Keeping the circumferential gap 56 at this size reduces the likelihood that the o-ring 28 will squeeze between the opposing circumferential distal ends 52, 54 of the spacer clip when the oil level indicator tube assembly 10 is installed within the bore 12. Additionally, in an exemplary embodiment, when the spacer clip 32 is positioned on the oil level indicator tube assembly 10, an outer diameter 82 of the spacer clip 32 is less than an outer diameter 84 of the upper and lower beads 24, 26. This ensures that an outer surface 86 of the spacer clip 32 does not rub against the inner surface 30 of the bore 12 during installation of the oil level indicator tube assembly 10.

In another exemplary embodiment, referring again to FIG. 2, the spacer clip 32 has an axial length 88 and the o-ring 28 has a diameter 90. The combined axial length 88 of the spacer clip 32 and the diameter 90 of the o-ring 28 when the oil level indicator tube assembly 10 is not installed within the bore 12 is less than an axial distance 92 between the upper and lower beads 24, 26. This leaves additional clearance 94 between the upper and lower beads 24, 26 to accommodate compression of the o-ring 28 during installation of the oil level indicator tube assembly 10 within the bore 12. When the oil level indicator tube assembly 10 is installed within the bore 12 of the LCE 14, the o-ring 28 will compress radially and expand axially to an o-ring axial length 98, filling some of the additional clearance 94. Furthermore, referring again to FIG. 3, after installation of the oil level indicator tube assembly 10, a remaining clearance 96 will provide for thermal expansion of the o-ring 28 during operation of the engine.

An oil level indicator tube assembly 10 of the present disclosure offers several advantages. These include providing a spacer clip 32 to allow the upper bead 24 of the oil level indicator tube assembly 10 to be positioned further away from the lower bead 26, positioned in a section of the bore 12 which has a large enough diameter to provide clearance to minimize the possibility of scraping any applied coatings off the upper bead 24 during installation of the oil level indicator tube assembly 10 and due to vibration of the oil level indicator tube assembly 10 within the bore 12 during operation of the engine. Additionally, an oil level indicator tube assembly 10 of the present disclosure provides increased support to minimize the likelihood of cutting or shaving the o-ring 28 during installation of the oil level indicator tube assembly 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automotive engine structural component, comprising:
    an oil sump formed within the engine structural component;
    a bore extending from an exterior surface of the engine structural component to the oil sump, the bore including a first section, a second section, a shoulder and a third section, the first section extending inward from the exterior surface of the engine structural component and having a conical shape, wherein a diameter of the first section gradually becomes smaller extending from the exterior surface to the second section, the second section having a second diameter, the shoulder section being positioned between and interconnecting the second section and the third section, and the third section having a third diameter;
    an oil level indicator tube supported within the bore, the oil level indicator tube including:
        an upper bead;
        a lower bead;
        an o-ring positioned on the oil level indicator tube between the upper and lower beads, the o-ring forming a radial seal between the oil level indicator tube and an interior surface of the bore; and
        a spacer clip positioned between the upper bead and the o-ring.

2. The automotive engine structural component of claim 1, wherein the lower bead of the oil level indicator tube is positioned within the second section of the bore and immediately adjacent the shoulder section, the upper bead of the oil level indicator tube is positioned within the first section of the bore, and the o-ring is positioned within the second section of the bore.

3. The automotive engine structural component of claim 2, wherein the spacer clip includes a generally cylindrical c-shaped body having a first axial distal end, a second axial distal end, and first and second opposing circumferential distal ends that define a circumferential gap, and a relaxed inner diameter that is less than an outer diameter of the oil level indicator tube, the spacer clip adapted to flex, thereby expanding the circumferential gap to allow the oil level indicator tube to pass through the gap when the spacer clip is placed onto the oil level indicator tube, wherein, once placed onto the oil level indicator tube, an inner surface of the spacer clip frictionally engages the outer diameter of the oil level indicator tube.

4. The automotive engine structural component of claim 3, wherein the spacer clip is positioned between the upper bead and the o-ring such that the first axial distal end of the spacer clip is positioned within the first section of the bore and the second axial distal end of the spacer clip is positioned within the second section of the bore, the second axial distal end of the spacer clip adapted to push against the o-ring and prevent the o-ring from moving toward the upper bead during insertion of the oil level[N] indicator tube within the bore.

5. The automotive engine structural component of claim 4, wherein each of the first and second axial distal ends of the spacer clip have an outer annular chamfer with a first radius, an inner annular chamfer with a second radius, and a flat axial surface extending between the inner and outer annular chamfers.

6. The automotive engine structural component of claim 5, wherein the first radius of each of the outer annular chamfers is less than the second radius of each of the inner annular chamfers.

7. The automotive engine structural component of claim 6, wherein when the spacer clip is positioned on the oil level indicator tube, the circumferential gap is approximately 1.42 millimeters.

8. The automotive engine structural component of claim 7, wherein when the spacer clip is positioned on the oil level indicator tube, an outer diameter of the spacer clip is less than an outer diameter of the upper and lower beads.

9. The automotive engine structural component of claim 8, wherein the spacer clip has an axial length and the o-ring has a diameter, the combined axial length of the spacer clip and the diameter of the o-ring when the oil level indicator tube is not installed within the bore being less than the axial distance between the upper and lower beads to accommodate compression of the o-ring during installation of the oil level indicator tube within the bore and thermal expansion of the o-ring during operation of the engine.

10. An oil level indicator tube assembly adapted to be installed within a bore formed within an engine structural component, comprising:
   an upper bead;
   a lower bead adapted to contact a shoulder section of a bore within an engine structural component to provide a positive stop when the oil level indicator tube is installed within the bore;
   an o-ring positioned on the oil level indicator tube between the upper and lower beads, the o-ring adapted to form a radial seal between the oil level indicator tube and an interior surface of a bore in an engine structural component; and
   a spacer clip positioned between the upper bead and the o-ring, the spacer clip including a generally cylindrical c-shaped body having a first axial distal end, a second axial distal end, and first and second opposing circumferential distal ends that define a circumferential gap, and a relaxed inner diameter that is less than an outer diameter of the oil level indicator tube, the spacer clip adapted to flex, thereby expanding the circumferential gap to allow the oil level indicator tube to pass through the gap when the spacer clip is placed onto the oil level indicator tube, wherein, once placed onto the oil level indicator tube, an inner surface of the spacer clip frictionally engages the outer diameter of the oil level indicator tube.

11. The oil level indicator tube of claim 10, wherein the second axial distal end of the spacer clip is adapted to push against the o-ring and prevent the o-ring from moving toward the upper bead during insertion of the oil level[N] indicator tube within a bore of an engine structural component.

12. The oil level indicator tube of claim 11, wherein each of the first and second axial distal ends of the spacer clip have an outer annular chamfer with a first radius, an inner annular chamfer with a second radius, and a flat axial surface extending between the inner and outer annular chamfers.

13. The oil level indicator tube of claim 12, wherein the first radius of each of the outer annular chamfers is less than the second radius of each of the inner annular chamfers.

14. The oil level indicator tube of claim 13, wherein when the spacer clip is positioned on the oil level indicator tube, the circumferential gap is approximately 1.42 millimeters.

15. The oil level indicator tube of claim 14, wherein when the spacer clip is positioned on the oil level indicator tube, an outer diameter of the spacer clip is less than an outer diameter of the upper and lower beads.

16. The oil level indicator tube of claim 15, wherein the spacer clip has an axial length and the o-ring has a diameter, the combined axial length of the spacer clip and the diameter of the o-ring being less than the axial distance between the upper and lower beads to accommodate compression of the o-ring during installation of the oil level indicator tube within a bore and thermal expansion of the o-ring.

17. An oil level indicator tube assembly adapted to be installed within a bore formed within an engine structural component, comprising:
   an upper bead;
   a lower bead adapted to contact a shoulder section of a bore within an engine structural component to provide a positive stop when the oil level indicator tube is installed within the bore;
   an o-ring positioned on the oil level indicator tube between the upper and lower beads, the o-ring having a diameter and adapted to form a radial seal between the oil level indicator tube and an interior surface of a bore in an engine structural component; and
   a spacer clip positioned between the upper bead and the o-ring, the spacer clip including:
      a generally cylindrical c-shaped body having an axial length;
      a first axial distal end and a second axial distal end, each of the first and second axial distal ends of the spacer clip having an outer annular chamfer with a first radius, an inner annular chamfer with a second radius that is less than the first radius, and a flat axial surface extending between the inner and outer annular chamfers, the second axial distal end adapted to push against the o-ring and prevent the o-ring from moving toward the upper bead during insertion of the oil level[N] indicator tube within a bore of an engine structural component
      first and second opposing circumferential distal ends that define a circumferential gap that is approximately 1.42 millimeters, the spacer clip adapted to flex, thereby expanding the circumferential gap to allow the oil level indicator tube to pass through the gap when the spacer clip is placed onto the oil level indicator tube;
      an inner diameter in frictional engagement with an outer diameter of the oil level indicator tube; and
      an outer diameter that is less than an outer diameter of the upper and lower beads;
   wherein, the combined axial length of the spacer clip and the diameter of the o-ring is less than the axial distance between the upper and lower beads to accommodate compression of the o-ring during installation of the oil level indicator tube within a bore and thermal expansion of the o-ring.

\* \* \* \* \*